United States Patent
Brokenshire

(10) Patent No.: US 6,304,274 B1
(45) Date of Patent: Oct. 16, 2001

(54) METHOD AND SYSTEM FOR SLOPE CORRECTING LINE STIPPLES/STYLES

(75) Inventor: Daniel Alan Brokenshire, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,932

(22) Filed: Aug. 3, 1998

(51) Int. Cl.$^7$ .................................................. G06T 11/20
(52) U.S. Cl. ................................................................ 345/443
(58) Field of Search .................................. 345/443, 136; 382/269

(56) References Cited

U.S. PATENT DOCUMENTS

| | | | | |
|---|---|---|---|---|
| 4,996,653 | * | 2/1991 | Butler et al. | 345/443 |
| 5,167,015 | * | 11/1992 | Bair et al. | 345/135 |
| 5,309,553 | * | 5/1994 | Mukai et al. | 345/441 |
| 5,375,196 | * | 12/1994 | Vatti et al. | 345/428 |
| 5,444,825 | * | 8/1995 | Bain et al. | 345/443 |
| 5,519,822 | * | 5/1996 | Barkans et al. | 345/443 |
| 5,570,463 | * | 10/1996 | Dao | 345/443 |
| 5,617,524 | * | 4/1997 | Dao et al. | 345/426 |
| 5,625,769 | * | 4/1997 | Takada | 345/443 |
| 5,627,957 | * | 5/1997 | Dao et al. | 345/443 |
| 5,815,162 | * | 9/1998 | Levine | 345/443 |
| 5,815,163 | * | 9/1998 | Dao et al. | 345/443 |

* cited by examiner

*Primary Examiner*—Jeffery Brier
*Assistant Examiner*—Ryan Yang
(74) *Attorney, Agent, or Firm*—Volel Emile; Bracewell & Patterson, L.L.P.

(57) ABSTRACT

Accurate display of line stipple in line segments, situated off the vertical or horizontal planes, is achieved by employing a calculated constant as a slope correction factor. The calculated constant, termed line style count, is determined utilizing the absolute length of the line segment, a ratio implementing the absolute length of the line segment, the major axis component of the line segment and fraction bits in the line counter. For each step along the major axis on a data processing system display, a constant value of 1.0 and the calculated constant, line style count, is added to a line style pointer to slope correct line stipple. A pre-computed square-root table is stored in texture memory and accessed for pre-calculated values to assist in reducing the time required to calculate accurate line style pointers. A standard Bresenham line steps the line counter for every step along the major axis, so that the corrected line style count equals the ratio of the true line length and the rasterized (major axis) length.

12 Claims, 5 Drawing Sheets

METHOD AND SYSTEM FOR SLOPE CORRECTING LINE STIPPLES/STYLES

BACKGROUND OF THE INVENTION

1. Technical Field

The present invention relates in general to CAD/CAM applications in data processing systems and in particular to methods and systems for display of CAD/CAM drawings. Still more particularly, the present invention relates to a method and system for correction of stippled lines utilized in CAD/CAM drawings and display accuracy of the line.

2. Description of the Related Art

Data processing Systems that are primarily employed for graphics processes are used in many different areas of industry, business, education, home and government. Graphics applications for these systems are growing rapidly and include interactive planning, office automation, electronic publishing, animation and computer-aided design. The applications are developed utilizing various software "tools" that best work with the available data processing system hardware.

Computer Aided Design/Computer Aided Manufacturing ("CAD/CAM") is utilized to assist in preparing drawings to assist in design and building models of potential products. CAD/CAM plays a great part in providing drawings and assisting in manufacturing components of electrical, mechanical and electromechanical items such as automobile engines, draw works, oil well drilling rigs, high rise buildings, micro-processor devices and including airplanes, ships and space vehicles. Often the designs are implemented via drafting or blueprints. However, the designs are often utilized, interactively on a computer display, to determine possible physical properties of design elements by subjecting an on-line display model to various virtual stresses. By simulating actual conditions through virtual testing on a computer terminal, a design may be pre-tested without having to actually build the final product. It is important that the CAD design be accurate and rendered in sufficient detail to provide reliable results of the on-line testing.

CAD/CAM applications and draftspersons use stippled ("styled") lines to indicate specific drawing details. Stippled lines are lines comprised of different combinations of dashes and dots where each combination illustrates a particular type of view in a drawing. For example, in a drawing, one dashed line may indicate a hidden edge within a solid. Another dashed line may indicate a centerline of the same object. If the dashes are distorted, the lines may be confused. Therefore, it is important that the line stipple ("style") be easily distinguishable from other line styles.

On computer graphics systems, a line style is typically defined by a sequence of ones and zeroes. The line style is displayed on a video screen as a pattern of light ("on") and dark ("off") pixels in a rectangular array ("raster display") and identified by the number of on and off pixels (for example, 24 pixels on, 8 pixels off). Line rasterization is performed utilizing a Bresenham (developer of the technique) line drawing technique in which the line is rasterized with respect to its major axis (the axis in which the distance between its endpoints is largest). For each step along the major axis, a pixel is rendered (light, dark and sometimes shaded) and the line style pointer (a marker indicating the current position within the line style pattern) is incremented to point to the next entry in the line style pattern. The rendered pixel is drawn ("on" or shaded) if the current line style pointer points to a one in the pattern and not drawn ("off") if it points to a zero.

Since sequencing is done with respect to the major axis (either X or Y), lines drawn on the diagonal (dX=dY) result in a line style that appears to be 41% longer than the same line drawn horizontal or vertical. Any deviation from true horizontal or true vertical results in a line depicted with increased stipple length.

Current industry standard graphics APIs like OpenGL™, a graphics application interface of Silicon Graphics, Inc. of San Jose, Calif., are specified such that anti-aliased, stippled lines should be slope corrected. A stippled line on a display is considered to be a sequence of contiguous rectangles. Each rectangle is a size, in width and length, which is equal to one pixel and each rectangle is centered on the line segment. The rectangles referred to are pixels. To date, most vendors have not implemented slope correction of nominal width lines because of the expense in doing so.

In the past, several techniques have been utilized to slope correct a stippled line. One method of slope correction of the line style considered the line style pointer to be a fixed point number with one fractional bit.

FIG. 5, a flow diagram illustrating a method for slope correcting line stipples, illustrates this method.

The process begins at step 500, which depicts the application determining the originating and terminating vertex of the line to be slope corrected. The process proceeds to step 502, which illustrates determining the major and minor axis of the stipple segments within the line, where major axis is the axis with the largest change. The process then passes to step 504, which depicts the application beginning the procedure to slope correct the line. The process passes next to step 506, which illustrates adding 1.0 to the line style pointer at the first stipple segment in the line. For every step along the major axis, 1.0 is added to the line style pointer. The process continues to step 508, which depicts adding 0.5 to the style pointer and for every step along the minor axis, 0.5 is added to a line style counter. The line style count is utilized to step through the line style pattern as stippled lines are rasterized. The process next passes to step 510, which illustrates repeating the two preceding steps, 506 and 508, until the terminating vertex of the line is reached.

If this procedure is not applied to a line, the length of the individual stipples will appear longer than the true length. This correction technique, albeit very simple to implement, results in line stipples that can still be in error by over 10%.

Another known method uses line style assist logic that consists of a count down counter and a shrink/expand control bit. For every step along the major axis, the line style counter is incremented and the count down counter decremented. If the count down counter reaches zero, the counter is reloaded and the line style counter is incremented if shrink control is selected or decremented if expand control is selected. The accurate line style assist logic suffers from significant accuracy problems because not enough precision exists where it is needed the most (when the count down counter is small).

It would be desirable, therefore, to provide a method that would utilize presently existing hardware to provide accurate displays of line stipple in lines off the vertical or horizontal planes.

SUMMARY OF THE INVENTION

It is therefore one object of the present invention to provide a method and system to slope correct line stipples.

It is another object of the present invention to provide a method and system of slope correction that utilizes currently available hardware.

It is a further object of the present invention to provide a method and system of slope correction that produces displays of line styles that are accurate.

The foregoing objects are achieved as is now described. Accurate display of line stipple in line segments, situated off the vertical or horizontal planes, is achieved by employing a calculated constant as a slope correction factor. The calculated constant, termed line style count, is determined utilizing the absolute length of the line segment, a ratio implementing the absolute length of the line segment, the major axis component of the line segment and fraction bits in the line counter. For each step along the major axis on a data processing system display, a constant value of 1.0 and the calculated constant, line style count, is added to a line style pointer to slope correct line stipple. A pre-computed square-root table is stored in texture memory and accessed for pre-calculated values to assist in reducing the time required to calculate accurate line style pointers. A standard Bresenham line steps the line counter for every step along the major axis, so that the corrected line style count equals the ratio of the true line length and the rasterized (major axis) length.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2A depicts a resultant display generated by a preferred embodiment of the present invention;

DETAILED DESCRIPTION OF THE PREFERRED EMBODIMENT

Figure 1:
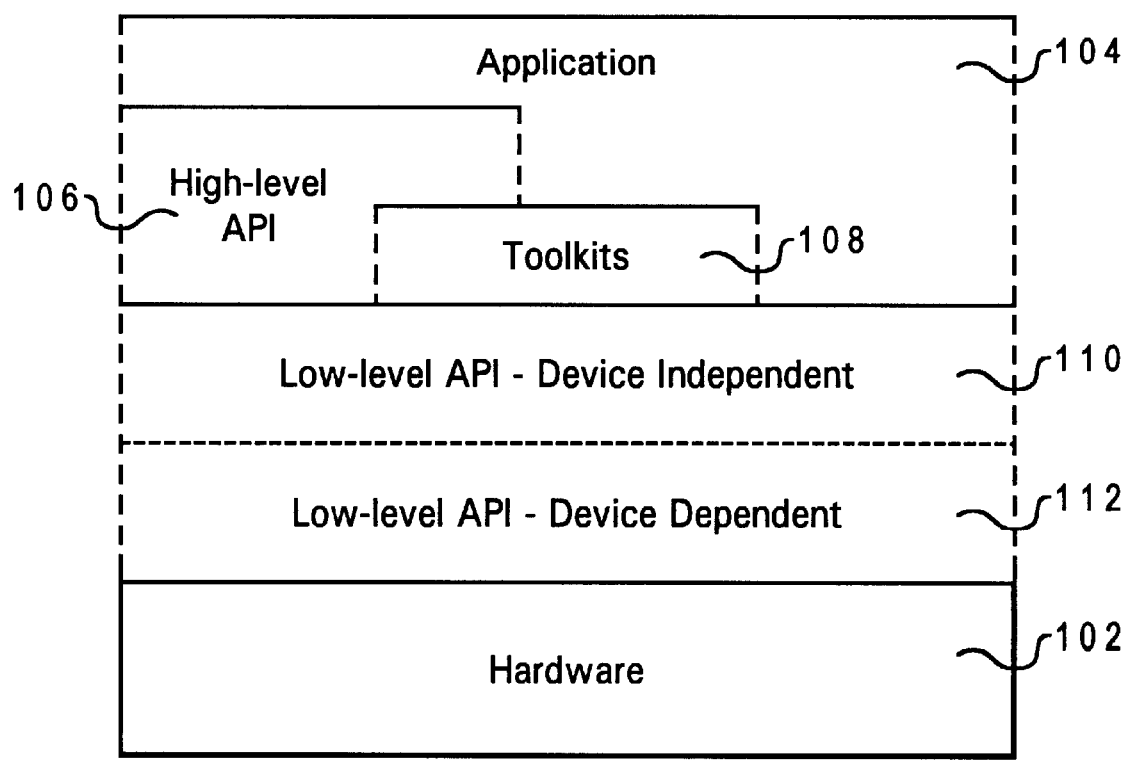
FIG. 1 depicts a high level block diagram of a graphics application architecture stack and related portions of a data processing system, in which a preferred embodiment of the present invention may be implemented.

With reference now to the figures, and in particular with reference to FIG. 1, a high level block diagram of a graphics application architecture stack and related portions of a data processing system, in which a preferred embodiment of the present invention may be implemented, are depicted. Graphics application architecture stack 100 is a typical example of application hierarchy in graphics focused data processing systems. Hardware 102 includes, among other elements, a system bus, graphics card, processor, video processor, main memory and a display (all not shown). Application 104 and the related software modules usually reside on the data processing system disk drive (not shown) or network hard drive (not shown).

Application 104 is a program that is typically utilized to perform a specialized task. Examples include CAD programs, animation programs and space planning programs. API is an acronym that stands for Application Programming Interface and includes subroutines, functions and methods that are available to application 104. High-level API 106 is an API that performs very high functions and often market specific tasks (large model visualization software, for example). Toolkits 108 are graphics utility libraries designed to perform common tasks that are regularly required in the application, such as drawing a block or a sphere. A low-level API is an API that performs rudimentary graphics requests such as drawing a line or drawing a polygon. Low-level API is generally architected into Low-level device independent 110 and Low-level device dependent 112 components. The Low-level device dependent 112 component directly interfaces with graphics hardware 102. A CAD program, as indicated above, is an example application utilizing graphics application architecture stack 100. Line drawings are common with CAD programs and generally stippled lines that are displayed are inaccurate and require correction if these lines are not displayed in an orthogonal axis.

Figure 2A:
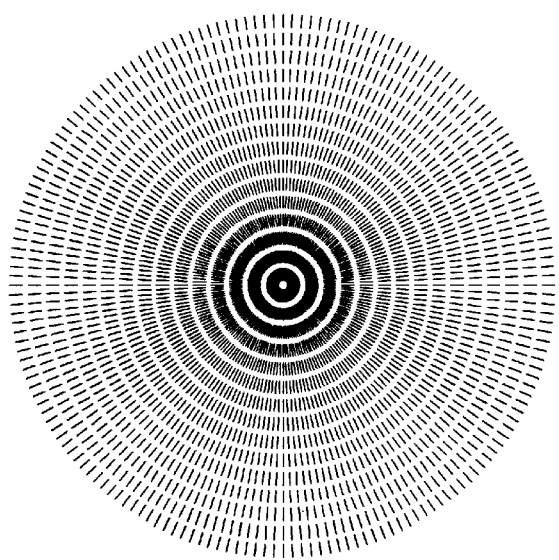
FIGS. 2A–2C are illustrations of display patterns with different degrees and methods of slope correction, where
Figure 2B:
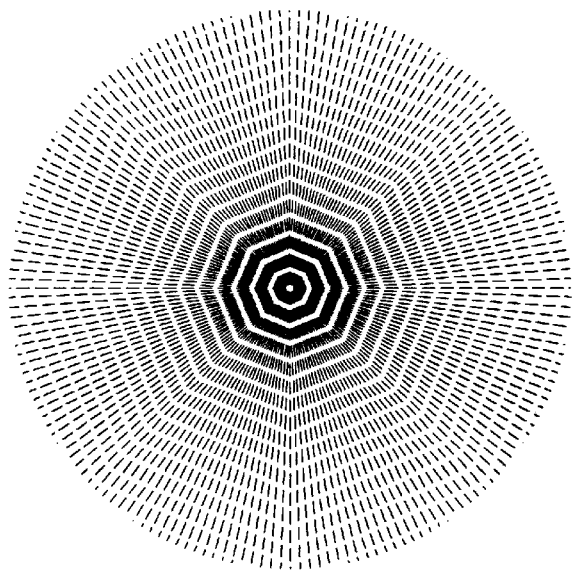
Figure 2C:
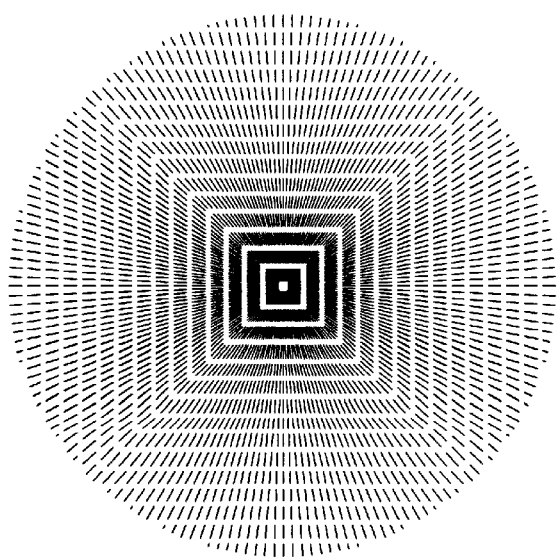

Turning now to FIGS. 2A–2C, patterns with different degrees and methods of slope correction are illustrated, where FIG. 2A depicts a resultant display generated by a preferred embodiment of the present invention. FIG. 2A is a 360 degree circular pattern of 180 stippled lines. There are two vertical lines (Y axis) and two horizontal lines (X axis). The stipple segments of the lines displayed on the X and Y axes are true length. Additionally, the lines displayed in all the other positions are true length. A circular pattern is an indication that all stipple segments displayed are the same length.

Figure 5:
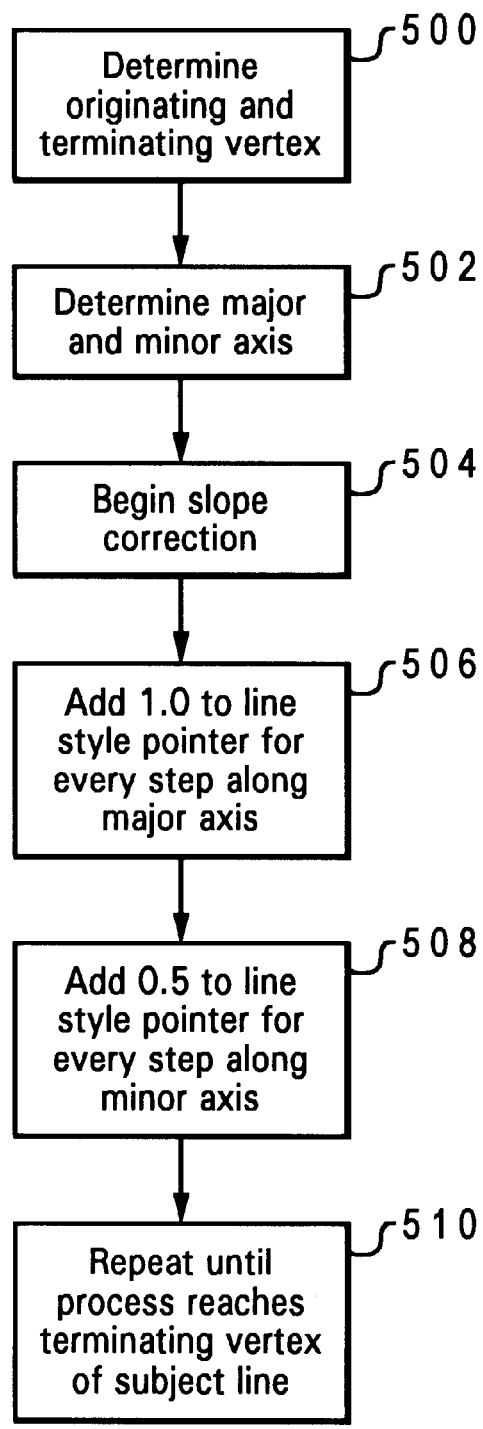
FIG. 5 is a flow diagram illustrating a prior art method for slope correcting line stipples.

Referring now to FIG. 2B, a pattern generated by the prior art method, as described in FIG. 5, is illustrated. As discussed previously the prior art method adds fixed values to the X and Y axes of each stipple segment to arrive at a corrected length. The irregular segment length, although approaching a circular pattern, falls visibly short. The irregularity of the line segments is an indication of unequal stipple segment lengths.

Turning to FIG. 2C, a non-slope corrected line pattern of 180 stippled lines is displayed. The two vertical lines (Y axis) and the two horizontal (X axis) lines are of a true length having stipple segments of equal length. Lines displayed that are at an angle to both the horizontal and vertical axes have the same total line length, but the stipple segments are of different lengths. The square pattern generated by the stipple segments is an indicator of a non-slope corrected line.

Figure 3:
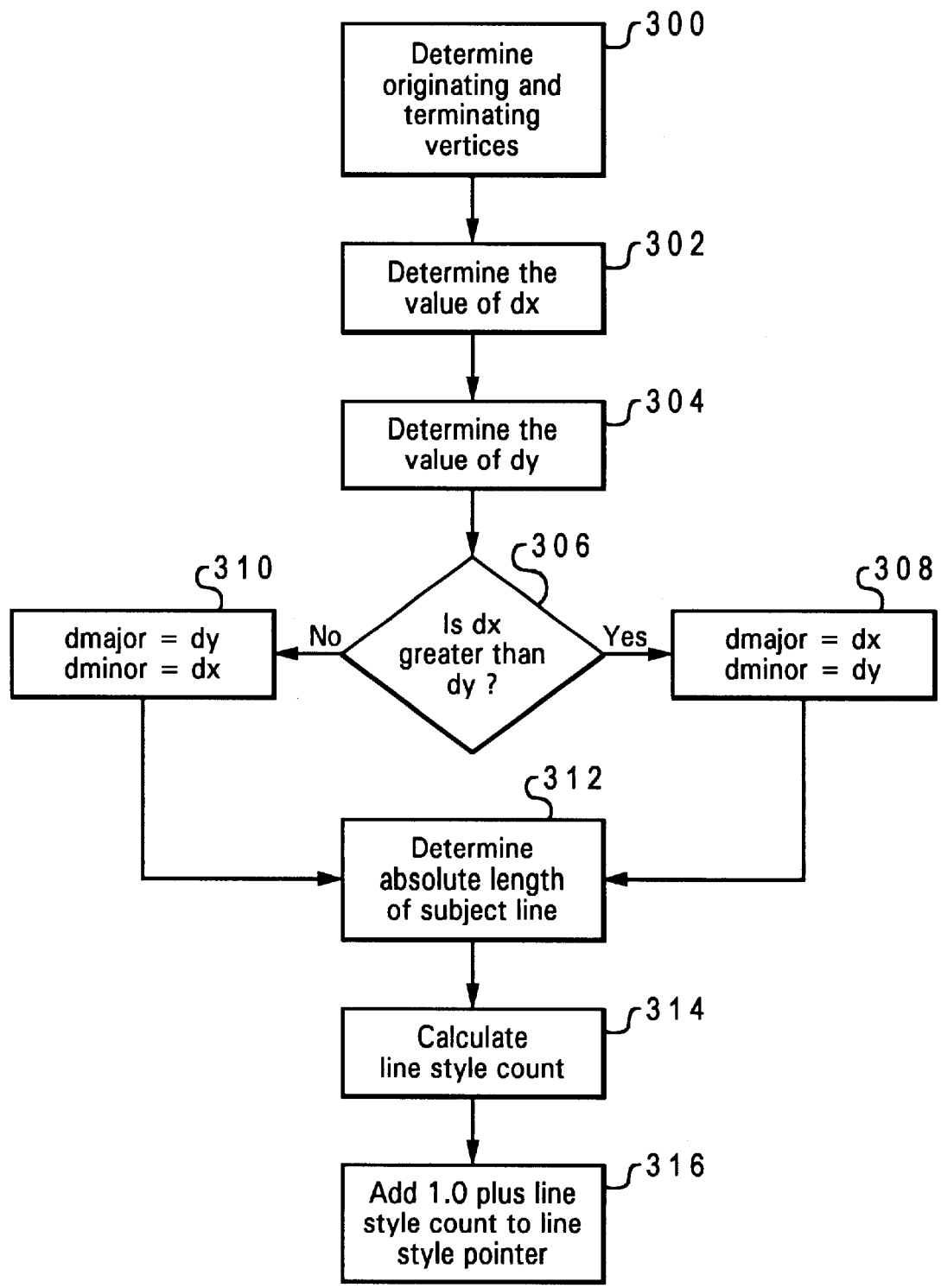
FIG. 3 depicts a high level logic flow diagram for slope correcting line stipples in accordance with the method of the present invention.

Turning now to FIG. 3, a high level logic flow diagram which depicts a method for slope correcting line stipples in accordance with the method and system of the present invention, is depicted. The process begins with step 300, which depicts the application determining the originating and terminating vertices for the stippled line segment to be corrected. The process continues with step 302, which illustrates determination of a value of the line segment length (dx) along the X axis utilizing the equation $$dx = abo(v1[x] - v2[x]).$$

In the equation, v1[x] is the originating vertex and v2[x] is the terminating vertex that defines the segment along the x axis. The process then passes to step 304, which depicts determination of the value of the stipple segment length (dy) along the Y axis utilizing the equation $$dy=abs(v1[y]-v2[y]).$$

In this equation, v1[y] is the originating vertex and v2[y] is the vertex that defines the segment along the y axis.

After the values are determined, the process next passes to step 306, which illustrates comparison of the values of dx and dy. If dx is greater than dy, the process then proceeds to step 308, which depicts assignment of the segment dx to dmajor, where dmajor is the major axis component of the line segment along the axis (horizontal or vertical) in which the line has the greatest change. The line segment dy is assigned to dminor, which is the minor axis component of the line segment along axis (horizontal or vertical) of smallest change. The process then passes to step 312, which illustrates calculation of the absolute length of the line segment, len, utilizing the equation $$len=sqrt(dx^2+dy),$$

where sqrt is the mathematical square root. The process then continues to step 314, which depicts the calculation of the line style count utilizing the equation $$line\_style\_count=(1<<COUNT\_BITS)*((len-dmajor)/dmajor)+0.5),$$

where COUNT_BITS is the number of fraction bits in the line style counter. The process then passes to step 316, which depicts the addition of 1.0 and the calculated line style count to the line style pointer to arrive at a consistent stipple length regardless of the orientation.

Referring back to step 306, if dx is not greater than dy, then the process proceeds instead to step 310, which illustrates the axis component dy assigned to dmajor and axis component dx assigned to dminor. The process next passes to step 312, which illustrates the calculation of the absolute length of the line segment (len) utilizing the equation $$len=sqrt(dx^2+dy^2),$$

where sqrt is the mathematical square root. The process then continues to step 314, which depicts the calculation of the line style count utilizing the equation $$line\_style\_count=(1<<COUNT\_BITS)*((len-dmajor)/dmajor)+0.5),$$

where COUNT_BITS is the number of fraction bits in the line style counter. The process then passes to step 316, which depicts the addition of 1.0 and the calculated line style count to the line style pointer to arrive at a consistent stipple length regardless of the orientation. Computations to determine the line style count are indicated below:

$$dx=abs(v1[x]-v2[x]; \quad (1)$$

$$dy=abs[v1[y]-v2[y]; \quad (2)$$

$$if(dx>dy) \; dmajor=dx; \; dminor=dy; \quad (3)$$

$$else \; dmajor=dy; \; dminor=dx; \quad (4)$$

$$len=sqrt(dx^2+dy^2); \quad (5)$$

$$line\_style\_count=(1<<COUNT\_BITS)*((len-dmajor/dminor)-0.5 \quad (6)$$

A diagonal line that is non-slope corrected would display stipple segments that would appear up to 41% longer than the horizontal or vertical display of that line. The present invention defines the process of accurately slope correcting the line stipple utilizing currently available hardware and software. It provides a major reduction in the distortion of the visual length of the stipple segments; from 41% to less than 0.2%.

Figure 4:
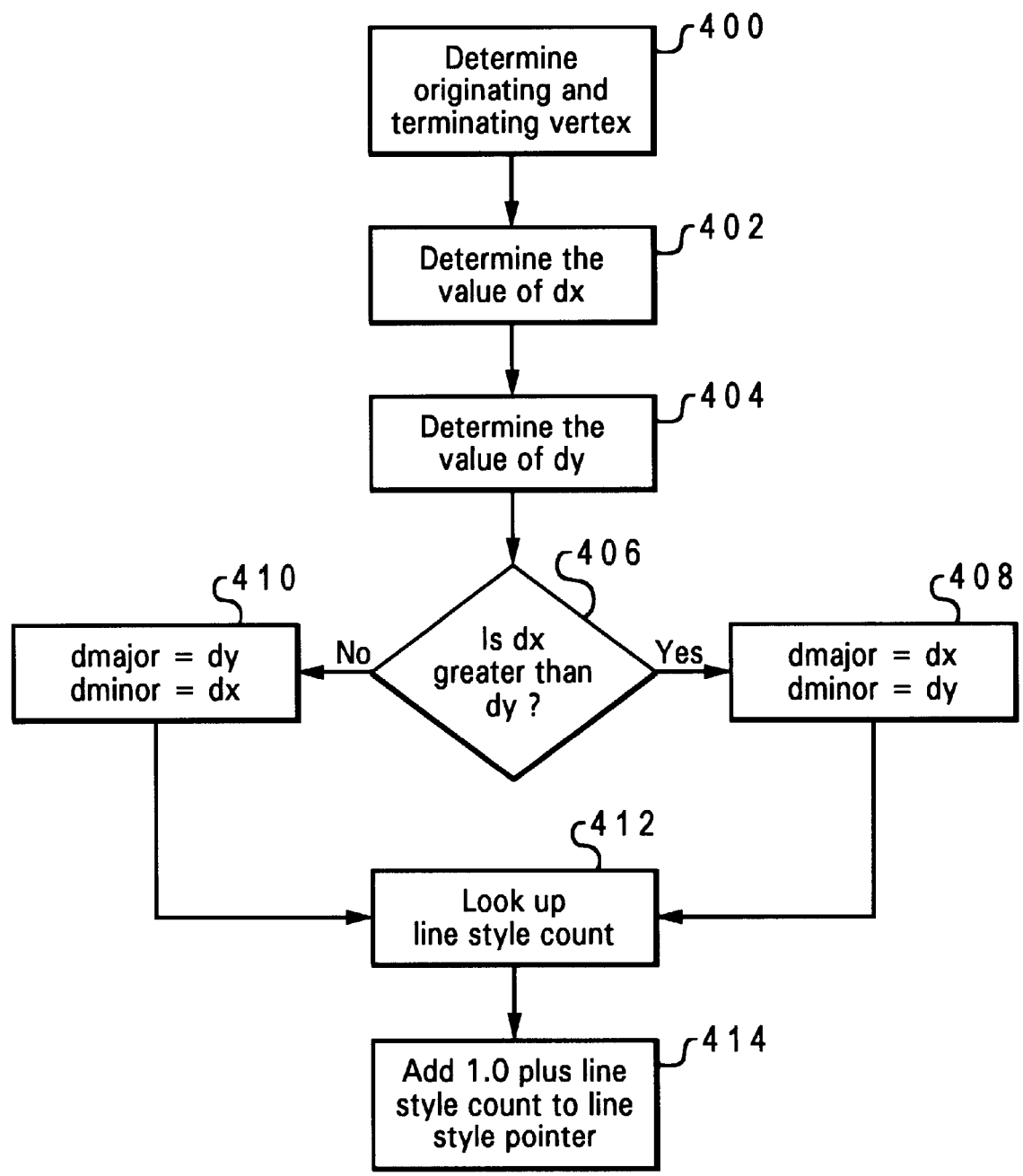
FIG. 4 depicts a second embodiment wherein a correction look-up table is substituted for the dynamic calculations in accordance with the method of the present invention.

Referring now to FIG. 4, a second embodiment wherein a correction look-up table is substituted for the dynamic calculations, described above, in accordance with the present invention, is depicted. The correction look-up table is static and contains pre-computed values that replace calculations of the embodiment of FIG. 3. The correction look-up table is pre-computed by the following equations for every segment's slope that may be displayed (i is a loop counter and TABLE_SIZE is the number of entries in the line style count table):

$$for \; (i=0; \; i<=TABLE\_SIZE; \; i++) \; \{ \quad (a)$$

$$slope=(float)(i)/TABLE\_SIZE; \quad (b)$$

$$len=sqrt(1.0+slope*slope); \quad (c)$$

$$lineStyleCountTable[i]=(1<<COUNT\_BITS)*(length-1.0)+0.5; \quad (d)$$

$$\} \quad (e)$$

An index for the table is determined utilizing existing perspective correction logic. The index is determined by the following calculation and entered into the correction look-up table:

$$index=(TABLE\_SIZE*(dminor/dmajor))+0.5$$

and $$line\_style\_count=lineStyleCountTable[index]$$

(pre-computed values correlating to the index).

The process for computing values (line_style_count) for entry into the table begins with step 400, which depicts the determination of the originating and terminating vertices of the line segment to be corrected. The process continues with step 402, which illustrates the determination of the value of the line segment length (dx) along the X axis utilizing the equation $$dx=abs(v1[x]-v2[x]).$$

In the equation, v1[x] is the originating vertex and v2[x] is the terminating vertex that defines the line segment along the X axis. The process then passes to step 404, which depicts the determination of the value of the line segment length (dy) along the Y axis utilizing the equation $$dy=abs(v1[y]-v2[y]).$$

In the equation, v1[y] is the originating vertex and v2[y] is the terminating vertex that defines the line segment along the y axis.

After the values are determined, the process next passes to step 406, which illustrates the comparison of the values of dx and dy. If dx is greater than dy, the process proceeds to step 408, which depicts the assignment of dx to dmajor and dy to dminor. The process then passes to step 412, which illustrates the acquisition of a pre-computed value corresponding to the relative length of the pre-computed line segment in the correction look-up table stored in texture memory.

The process then passes to step 414, which depicts the addition of 1.0 and the calculated line style count to the line style pointer to arrive at a consistent stipple length regardless of the orientation.

Referring back to step 406, if dx is not greater than dy, the process proceeds instead to step 410, which illustrates the assignment of dy to dmajor and dx to dminor.

The process then passes to step 412, which illustrates the acquisition of a pre-computed value in the correction look-up table as determined by the coordinates of the vertices determined by step 404 through step 410. The correction look-up table is a static table stored in texture memory and is pre-computed, by equations discussed above, for line segment slopes that may be displayed. Further, line segment slopes not in the correction table are determined by linear interpolation between table entries, wherein interpolation increases the accuracy of the correction table or allows for a reduced table size.

The process then passes to step 414, which depicts the addition of 1.0 and the calculated line style count to the line style pointer to arrive at a consistent stipple length regardless of the orientation.

The correction look-up table embodiment provides additional advantages to the present invention. Looking up a value in the correction look-up table requires less time than calculating the same value. Additionally, the table is available in texture memory and eliminates the need to add processing hardware. Accuracy can be improved from 41% error to an error of less than 0.2% utilizing only 8 bits.

Calculations for dmajor and dminor are performed by all current line rasterization hardware. Length and line_style_count calculations are implemented utilizing texture mapping hardware and perspective logic. The correction look-up table is stored as a one dimension texture map. The texture map's width is TABLE_SIZE and vertices texture coordinates are sourced from internally computed values where S(texture coordinate s/w)=dminor and Q(texture coordinate q/w)=dmajor.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for correcting stipple in a line, comprising:
pre-calculating stipple correction factors for a plurality of line segment slope constants by:
determining originating and terminating vertices of the line segment;
determining a major axis component and a minor axis component of the line segment by utilizing end point vertices of the line segment for calculating the value of the major axis component and a value of the minor axis component;
utilizing the major axis component value and the minor axis component value to calculate the line style count from an absolute length of the line segment minus the major axis component, all divided by the minor axis component; and
employing the line style count to determine a line style pointer slope-correcting the stipple for a portion of the line segment.

2. The method in claim 1, wherein the step of utilizing the major axis component value and the minor axis component value to calculate the line style count from an absolute length of the line segment minus the major axis component, all divided by the minor axis component further comprises:
calculating an absolute length of the line segment;
determining a ratio of the absolute length of the line segment to the major axis component value;
determining a number of fraction bits employed for the line style count; and
employing the number of fraction bits, the major axis component value and the absolute length of the line segment to calculate the line style count.

3. The method in claim 1, wherein the step of employing the line style count to determine a line style pointer slope-correcting the stipple for a portion of the line segment further comprises:
determining endpoint vertices of the line segment;
storing a correction look-up table in texture memory;
calculating multiple fractional constants and entering the multiple fractional constants into the correction look-up table;
utilizing perspective correction logic to generate a correction look-up table index;
retrieving a fractional constant associated with the correction look-up table index;
interpolating between table entries when a line segment slope is not in the correction look-up table; and
adding the fractional constant to each increment of the line style pointer in determining a next starting location for a next portion of the line segment.

4. The method in claim 3, wherein the step of calculating multiple fractional constants and entering the multiple fractional constants into the correction look-up table further comprises:
calculating an absolute length for each one of a plurality of line segments each having a different length or slope;
calculating a line style count for each of the plurality of line segments;
entering the absolute length and the line style count for each of the plurality of line segments into the correction look-up table.

5. A system for correcting stipple in a line, comprising:
calculation means for pre-calculating stipple correction factors for a plurality of line segment slope constants comprising:
calculation means for determining originating and terminating vertices of the line segment;
means for determining a major axis component and a minor axis component of the line segment by utilizing end point vertices of the line segment for calculating the value of the major axis component and a value of the minor axis component; means for utilizing the major axis component value and the minor axis component value to calculate the line style count from an absolute length of the line segment minus the major axis component, all divided by the minor axis component; and implementation means for employing the line style count to determine a line style pointer slope-correcting the stipple for a portion of the line segment.

6. The system in claim 5, wherein means for utilizing the major axis component value and the minor axis component value to calculate the line style count from an absolute length of the line segment minus the major axis component, all divided by the minor axis component; further comprises:

calculation means for calculating an absolute length of the line segment;

calculation means for determining a ratio of the absolute length of the line segment to the major axis component value;

computation means for determining a number of fraction bits employed for the line style count; and calculation means for employing the number of fraction bits, the major axis component value and the absolute length of the line segment to calculate the line style count.

7. The system in claim 5, wherein the calculation means for employing the line style count to determine a line style pointer in the line segment further comprises:

means for determining endpoint vertices of the line segment;

storage means for storing a correction look-up table in a texture memory;

calculation means for calculating multiple fractional constants and entering the multiple fractional constants into the correction look-up table;

generation means for utilizing perspective correction logic to generate a correction look-up table index;

means for retrieving a fractional constant associated with the correction look-up table index;

calculation means for interpolating between table entries when a line segment slope is not in the correction look-up table; and addition means for adding the fractional constant to each increment of the line style pointer in determining a next starting location for a next portion of the line segment.

8. The system in claim 7, wherein the calculation means for calculating multiple fractional constants and entering the multiple fractional constants into the correction look-up table further comprises:

means for calculating an absolute length for each one of a plurality of line segments each having a different length or slope;

computation means for calculating a line style count for each of the line segments; and means for entering the absolute length and the line style count for each of the line segments into the correction look-up table.

9. A computer program product within a computer usable medium for correcting stipple in a line, comprising:

instructions for pre-calculating stipple correction factors for a plurality of line segment slope constants by:
determining originating and terminating vertices of the line segment;

determining a major axis component and a minor axis component of the line segment by utilizing end point vertices of the line segment for calculating the value of the major axis component and a value of the minor axis component; utilizing the major axis component value and the minor axis component value to calculate the line style count from an absolute length of the line segment minus the major axis component, all divided by the minor axis component; and instructions for employing the line style count to determine a line style pointer slope-correcting the stipple for a portion of the line segment.

10. The computer program product in claim 9, wherein the instructions for utilizing the major axis component value and the minor axis component value to calculate the line style count from an absolute length of the line segment minus the major axis component, all divided by the minor axis component further comprises:

instructions for calculating an absolute length of the line segment;

instructions for determining a ratio of the absolute length of the line segment to the major axis component value;

instructions for determining a number of fraction bits employed for the line style count; and instructions for employing the number of fraction bits, the major axis component value and the absolute length of the line segment to calculate the line style count.

11. The computer program product in claim 9, wherein the instructions for employing the line style count to determine a line style pointer slope-correcting the stipple for a portion of the line segment further comprises:

instructions for determining endpoint vertices of the line segment;

instructions for storing a correction look-up table in texture a memory;

instructions for calculating multiple fractional constants and entering the multiple fractional constants into the correction look-up table;

instructions for utilizing perspective correction logic to generate a correction look-up table index;

instructions for retrieving a fractional constant associated with the correction look-up table index;

instructions for interpolating between table entries when a line segment slope is not in the correction look-up table; and instructions for adding the fractional constant to each increment of the line style pointer in determining a next starting location for a next portion of the line segment.

12. The computer program product in claim 11, wherein the instructions for calculating multiple fractional constants and entering the multiple fractional constants into the correction look-up table further comprises:

instructions for calculating an absolute length for each one of a plurality of line segments each having a different length or slope;

instructions for calculating a line style count for each of the plurality of line segments;

instructions for entering the absolute length and the line style count for each of the plurality of line segments into the correction look-up table.

* * * * *

UNITED STATES PATENT AND TRADEMARK OFFICE
CERTIFICATE OF CORRECTION

PATENT NO. : 6,304,274 B1
DATED : October 16, 2001
INVENTOR(S) : D. Brokenshire

It is certified that error appears in the above-identified patent and that said Letters Patent is hereby corrected as shown below:

<u>Column 4,</u>
Line 62, please correct "dx=abo" to -- dx=abs --

Signed and Sealed this

Seventh Day of May, 2002

Attest:

JAMES E. ROGAN
*Attesting Officer*     *Director of the United States Patent and Trademark Office*